United States Patent
Sbetti

(10) Patent No.: US 11,370,059 B2
(45) Date of Patent: *Jun. 28, 2022

(54) METHOD OF LASER PROCESSING OF A METALLIC MATERIAL WITH OPTICAL AXIS POSITION CONTROL OF THE LASER RELATIVE TO AN ASSIST GAS FLOW, AND A MACHINE AND COMPUTER PROGRAM FOR THE IMPLEMENTATION OF SAID METHOD

(71) Applicant: ADIGE S.p.A., Levico Terme (IT)

(72) Inventor: Maurizio Sbetti, Levico Terme (IT)

(73) Assignee: ADIGE S.p.A., Levico Terme (IT)

( * ) Notice: Subject to any disclaimer, the term of this patent is extended or adjusted under 35 U.S.C. 154(b) by 723 days.

This patent is subject to a terminal disclaimer.

(21) Appl. No.: 15/641,425

(22) Filed: Jul. 5, 2017

(65) Prior Publication Data
US 2018/0009061 A1  Jan. 11, 2018

(30) Foreign Application Priority Data

Jul. 6, 2016  (IT) .................. 102016000070259

(51) Int. Cl.
*B23K 26/06* (2014.01)
*G02B 7/182* (2021.01)
(Continued)

(52) U.S. Cl.
CPC .......... *B23K 26/0626* (2013.01); *B23K 26/06* (2013.01); *B23K 26/0643* (2013.01);
(Continued)

(58) Field of Classification Search
CPC .............. B23K 26/0626; B23K 26/082; B23K 26/0608; B23K 26/032; B23K 26/0648; B23K 26/064; B23K 26/073; B23K 26/0604; B23K 26/0676; B23K 26/0876; B23K 26/0869; B23K 26/0643; B23K 26/08; B23K 26/0652; B23K 26/0665; B23K 26/1464; B23K 26/702; B23K 26/705; B23K 26/0821; B23K 26/14;
(Continued)

(56) References Cited

U.S. PATENT DOCUMENTS

| | | | |
|---|---|---|---|
| 4,202,605 A | 5/1980 | Heinz | |
| 5,101,091 A * | 3/1992 | Grub | ..................... B23K 26/04 |
| | | | 219/121.74 |

(Continued)

FOREIGN PATENT DOCUMENTS

| | | | |
|---|---|---|---|
| JP | 2001038485 A | | 2/2001 |
| JP | 2003305584 A | * | 10/2003 |

OTHER PUBLICATIONS

Search Report for IT201600070259 dated Apr. 26, 2017.

*Primary Examiner* — John J Norton
(74) *Attorney, Agent, or Firm* — ArentFox Schiff LLP; Michael Fainberg

(57) ABSTRACT

A method of laser processing of a metallic material is described. Furthermore, disclosed herein are aspects of a machine for laser processing of a metallic material arranged to implement the laser processing method, and a computer program comprising one or more code modules for implementing the aforementioned method when the program is executed by electronic processing means.

12 Claims, 7 Drawing Sheets

(51) Int. Cl.
  *G02B 7/02* (2021.01)
  *G02B 5/08* (2006.01)
  *B23K 26/073* (2006.01)
  *B23K 26/14* (2014.01)

(52) U.S. Cl.
  CPC ........ *B23K 26/0665* (2013.01); *B23K 26/073* (2013.01); *B23K 26/14* (2013.01); *G02B 5/08* (2013.01); *G02B 7/02* (2013.01); *G02B 7/182* (2013.01)

(58) Field of Classification Search
  CPC .......................... B23K 26/067; B23K 26/0673; B23K 26/362; B23K 26/062; B23K 26/10; B23K 26/123; B23K 26/22; B23K 26/34; B23K 26/704; B23K 26/035; B23K 26/046; B23K 26/048; B23K 26/0613; B23K 26/707; B23K 26/02; B23K 26/042; B23K 26/06; B23K 26/0619; B23K 26/103; B23K 26/128; B23K 2103/54; B23K 2101/36; B23K 15/0013; B23K 15/02; B23K 26/0732; B23K 26/0734; B23K 26/0736; B22F 2203/00; H01L 21/268; H01L 21/02683; H01L 21/02686; H01L 21/02691; H01L 21/67115; H01L 21/76894; H01S 3/0071; H01S 3/2308; H01S 3/0014; H01S 3/005; H01S 3/0085; H01S 3/067; H01S 3/0806; H01S 3/097; H01S 3/10; H01S 3/101; H01S 3/13; H01S 3/225; H01S 3/2251; H01S 3/23; H01S 3/2383; H01S 5/0428; H01S 5/4018; H01S 5/005; H01S 5/0071; H01S 5/0085; H01S 5/042; H01S 5/068; H01S 5/4012; H01S 5/4081; H01S 5/4087; G01J 1/4257; G01J 1/0238; G01J 1/0411; G01J 1/0488; G01J 2001/4261; G02B 27/283; G02B 6/4296; G02B 6/43; G02B 6/02147; G02B 6/10; G02B 6/124; G02B 6/13; G02B 6/2552; G02B 6/262; G02B 6/266; G02B 6/2706; G02B 6/2804; G02B 6/2808; G02B 6/29341; G02B 6/32; G02B 6/4204; G02B 6/4213; G02B 6/4214; G02B 6/4215; G02B 6/4225; G02B 6/4226; G02B 6/4227; G02B 26/02; G02B 26/105; G02B 26/123; G02B 26/4206; G02B 26/425; G02B 26/101; G02B 26/12; G02B 19/0009; G02B 19/0047; G02B 1/12; G02B 21/0024; G02B 27/0927; G02B 27/1006; G02B 27/106; G02B 27/14; G02B 27/28; G02B 27/281; G02B 5/1857; G02B 5/20; G02B 5/30; G02B 5/3025

USPC ...... 219/121.83, 121.61, 64, 121.69, 121.73, 219/121.72, 121.8, 121.85, 121.78, 74, 219/121.71, 121.74, 121.75; 438/487, 16, 438/7; 239/416.4, 418, 424; 250/221, 250/492.1; 356/153, 237.2; 700/166, 67
  See application file for complete search history.

(56) References Cited

U.S. PATENT DOCUMENTS

| | | | | |
|---|---|---|---|---|
| 6,407,363 | B2* | 6/2002 | Dunsky | B23K 26/02 219/121.71 |
| 6,706,998 | B2* | 3/2004 | Cutler | B23K 26/08 219/121.72 |
| 6,756,563 | B2* | 6/2004 | Gross | B23K 26/0626 219/121.7 |
| 8,619,357 | B2* | 12/2013 | Gaudiosi | H01S 3/2308 359/333 |
| 2002/0008091 | A1 | 1/2002 | Brandinger et al. | |
| 2010/0044353 | A1* | 2/2010 | Olsen | B23K 26/082 219/121.72 |
| 2011/0108533 | A1* | 5/2011 | Boettcher | B23K 26/1436 219/121.72 |
| 2014/0220374 | A1* | 8/2014 | Bruck | C30B 11/04 219/73 |
| 2014/0246405 | A1* | 9/2014 | Numata | B23K 26/14 219/74 |
| 2014/0346155 | A1* | 11/2014 | Jurca | B23K 26/0643 219/121.81 |
| 2015/0331205 | A1* | 11/2015 | Tayebati | G02B 6/4215 385/27 |
| 2015/0378184 | A1* | 12/2015 | Tayebati | G02F 1/295 250/492.1 |
| 2016/0136758 | A1* | 5/2016 | Kawasaki | B23K 26/144 |
| 2018/0009062 | A1* | 1/2018 | Sbetti | B23K 26/14 |
| 2019/0151985 | A1* | 5/2019 | Sbetti | B23K 26/06 |

* cited by examiner

METHOD OF LASER PROCESSING OF A METALLIC MATERIAL WITH OPTICAL AXIS POSITION CONTROL OF THE LASER RELATIVE TO AN ASSIST GAS FLOW, AND A MACHINE AND COMPUTER PROGRAM FOR THE IMPLEMENTATION OF SAID METHOD

CROSS-REFERENCE TO RELATED APPLICATIONS

This application claims priority to Italian Patent Application No. 102016000070259 filed on Jul. 6, 2016, the entire contents of which is hereby incorporated in its entirety by reference.

FIELD OF THE INVENTION

The present invention relates to the laser processing of a metallic material, more specifically, a laser processing method for cutting, drilling or welding of said material.

According to other aspects, the present invention relates to a machine for laser processing of a metallic material arranged to implement the laser processing method, and a computer program comprising one or more code modules for implementing the aforementioned method when the program is executed by electronic processing means.

BACKGROUND OF THE INVENTION

In the following description and the claims, the term "metallic material" is used to define any metallic workpiece such as a sheet or elongated profile having indifferently a closed cross-section—for example a hollow circular, rectangular or square form—or an open one—e.g. a flat section or a section in the form of an L, C, U, etc.

In industrial metal processing methods, and in particular those of metallic sheets and profiles, the laser is used as a thermal tool for a wide variety of applications that depend on the interaction parameters of the laser beam with the material being processed, specifically on the energy density per incidence volume of the laser beam on the material and on the interaction time interval.

For example, by directing a low energy density (on the order of tens of W per $mm^2$ of surface) for a prolonged time (on the order of seconds), a hardening process is achieved, while directing a high energy density (on the order of tens of MW per $mm^2$ of surface) for a time on the order of femtoseconds or picoseconds, a photo-ablation process is achieved. In the intermediate range of increasing energy density and decreasing working time, the control of these parameters enables welding, cutting, drilling, engraving and marking processes to be carried out.

In many processes, including drilling and cutting processes, an assist gas flow must be provided to the working region wherein the interaction between the laser beam and the material occurs which has the mechanical functions of propulsion of the molten material, or the chemical functions of assisting the combustion, or even the technological functions of shielding from the environment surrounding the working region.

In the field of laser processing of metallic materials, laser cutting, drilling and welding are processing operations that may be carried out by the same machine, which is adapted to generate a high-powered focused laser beam having a predetermined transverse power distribution on at least one working plane of the metallic material, typically a laser beam with a power density ranging from 1 to 10000 $kW/mm^2$, and to govern the beam direction and position of incidence along the material. The difference between the different types of processing that may be performed on a material is substantially ascribable to the power of the laser beam used and the time of interaction between the laser beam and the material subject to processing.

Laser processing machines according to the prior art are shown in FIGS. 1 and 2.

FIG. 1 schematically shows an industrial processing machine with a $CO_2$ laser with an optical path of the laser beam in the air, which comprises an emitting source 10, such as a $CO_2$ laser generator device, capable of emitting a single-mode or multi-mode laser beam B and a plurality of reflective mirrors 12a, 12b, and 12c adapted to conduct the laser beam emitted from the emitting source along a beam transport optical path towards a working head, indicated collectively at 14, arranged in proximity of a material WP. The working head 14 comprises an optical focusing system 16 of the laser beam, generally consisting of a focusing lens, adapted to focus the laser beam along an optical axis of propagation incident on the metallic material. A nozzle 18 is arranged downstream of the focusing lens and is crossed by the laser beam directed towards an area of a working plane of the material. The nozzle is adapted to direct a beam of an assist gas injected by a corresponding system not shown toward the working area on the material. The assist gas is used to control the execution of a working process as well as the quality of the processing obtainable. For example, the assist gas may comprise oxygen, which favors an exothermic reaction with the metal, allowing the cutting speeds to be increased, or an inert gas such as nitrogen which does not contribute to the fusion of the material but protects the material from unwanted oxidation at the edges of the working profile, protects the working head from any splashes of molten material and may also be used to cool the sides of the groove produced on the material, confining the expansion of the thermally altered area.

FIG. 2 shows schematically an industrial processing machine with the laser beam channeled through fiber optics. It comprises an emitting source 10, such as a laser generating device capable of feeding a laser beam into a transport fiber, for example a laser fiber doped with ytterbium, or a direct diode laser, adapted to emit a single-mode or multi-mode laser beam, and a fiber optic cable 12d adapted to conduct the laser beam emitted from the emitting source to the working head 14 arranged in proximity to the material M. At the working head, the laser beam emerging from the fiber with its divergence controlled is collimated by a collimating dioptric system 20 and reflected by a catoptric system 22 before being focused through an optical focusing system 16, generally consisting of a focusing lens, along an optical axis of propagation incident on the WP material passing through the emitting nozzle 18.

FIG. 3 illustrates an exemplary working head 14 according to the prior art. At 30 a tubular channel is represented having cylindrical or conical sections within which the laser beam is transmitted, indicated at B. The laser beam B generated by the emitting source 10 and transported to the working head by means of an optical path in air with multiple reflections or in fiber optics collimates on a reflective deflector element 32 that deflects its optical propagation axis in a direction of incidence on the material being processed. The optical focusing system 16 is intermediate between the reflective deflector element 32 and a protective slide 34 arranged downstream, adapted to shield the focusing system from any splashes of molten material, and comprises a lens holder unit 36 to which are coupled mechanical adjustment mechanisms 38 for calibrating the positioning of the lens transversely to the direction of propagation of the beam (X-Y axes) and in the direction of propagation of the beam (Z axis).

The optical processing to which the laser beam is subjected in the working head is diagrammed in FIGS. 4 and 5.

The laser beam B originating from an emitting source S through an optical transport path in the free space or in the fiber reaches the working head with a predetermined divergence. An optical collimation system, shown in FIG. 4 by the lens C, provides for collimating the laser beam B, directing it to an optical focusing system arranged downstream, represented by the lens F, capable of producing a focused laser beam. At first approximation, an ideal laser beam, i.e. a laser beam ideally collimated in parallel rays, downstream of an optical focusing system is concentrated on a focal point according to the laws of geometric optics. Physical laws of diffraction, however, indicate that the laser beam even in the best collimation and focusing configuration has, downstream of the optical focusing system, a finite focal spot at its waist. This is represented in FIG. 4 by the region indicated W, which corresponds to the focal area of the beam B. Generally, in industrial processing uses, the working plane of a material coincides with the transversal plane at the waist of the beam.

FIG. 5 shows the distribution of the power density of a normally collimated laser beam, which is typically Gaussian in shape with rotational symmetry in the case of a single-mode beam, i.e. with power concentrated around the longitudinal axis of the beam (Z axis) and gradually decreasing along a peripheral skirt, or it may be described as the envelope of Gaussian profiles with rotational symmetry in the case of a multi-mode beam.

The use of beams with a single-mode or multi-mode laser radiation, which may be described in a first approximation as Gaussian, meets technological control requirements in the field of high-power laser applications. Indeed, a Gaussian beam is easily described by a few parameters and is easily controllable in its propagation along an optical transport path from an emitting source to the head of a processing machine because it has the characteristic of propagating itself without modifying the power distribution, whereby it may be described via a radius value and a divergence value in far-field propagation conditions (in which case a geometric optics approximation may be used). In the propagation conditions of the focused beam in the near-field along a working path where the geometric optics approximation is no longer valid, the beam in any case maintains the Gaussian power distribution pattern in each of its cross sections.

For these reasons, in the field of laser processing, there has always been a need to control the propagation of the laser beam so that it has a Gaussian (or approximately Gaussian) cross-sectional power distribution and to establish once and for all the relative mutual position between the optical axis of propagation of the laser beam and the barycentric axis of the assist gas flow.

A number of solutions have been developed in the prior art adapted to provide a stability (if not a rigidity) of positioning between the optical axis of propagation of the laser beam and the outflow axis of the assist gas, and this generally involves the coincidence of the two axes. The adjustment of the mutual position between the optical axis of propagation of the laser beam and the axis of the assist gas flow is performed in the prior art by means of a mechanical centering procedure performed manually by an operator during periodic calibration of the machine (working head), for example when it is necessary to change the nozzle due to wear. Such a mechanical centering procedure involves a plurality of fine mechanical adjustments, for example by means of a screw drive on the deflector mirror or on the collimation or focusing lenses to adjust the inclination and centering of the optical propagation system of the laser beam relative to the positioning of the nozzle on the head.

This design choice, which in the case of a purely single-mode beam respects the rotational symmetry of the beam and the assist gas flow, respectively dictated by the Gaussian distribution of the power of the laser beam and by the circular section of the mouth of the outflow nozzle of the assist gas, ensures the isotropy of the behavior of each working process (cutting, welding, etc.) with respect to the directions that processing may follow.

The isotropy of the process with respect to the working paths on the material has always been considered advantageous where a laser working process is controlled by electronic processing means according to any paths and geometries, predetermined in CAD/CAM systems.

SUMMARY OF THE INVENTION

It is widely believed that a physically "unbalanced" system or without rotational symmetry at the points of incidence of the laser beam and the assist gas on the material results in complexity and difficulties in controlling the working paths, or worse quality of the processing results.

The object of the present invention is to provide a laser processing method with improved performance in terms of the operating speed, quality of results and cost-effectiveness of the process.

Another object of the present invention is to provide a laser processing method controllable in real time to obtain precise processing results in all operating conditions, achievable without increasing the size of existing machines.

According to the present invention, these objects are achieved via a laser processing method of a metallic material having the features referred to in claim 1.

Particular embodiments are object of the dependent claims the content of which is to be understood as an integral part of the present description.

A further object of the invention is a machine for the laser processing of a metallic material and a computer program, as claimed.

In summary, the present invention builds on the consideration that a breaking of the rotational symmetry of the laser beam and assist gas flow assembly, i.e. a departure from the condition of coincidence between the propagation axes of the laser radiation and the outflow axis of the assist gas flow, may allow one to obtain better benefits in terms of speed, quality and cost-effectiveness than the working process with the same performance.

The modes of application and exploitation of the breaking of rotational symmetry may be different, and in particular such modes comprise a "static" modification of the position of the optical axis of the processing laser beam relative to the axis of symmetry of the assist gas flow and a "dynamic" modification or in an "apparent beam" regime of the position of the optical axis of the processing laser beam relative to the axis of symmetry of the assist gas flow.

In the case of "static" modification, the relative position of the optical axis of the laser beam relative to the axis of symmetry of the assist gas flow (distance, angle relative to a local advance direction along the working path, assumed as reference direction) is fixed or varied at a comparable relative speed (i.e., of the same order of magnitude) with the advance speed of the working process.

As a result of an imbalance of the position of the optical axis of the laser beam, ahead of the axis of symmetry of the assist gas flow in the translation direction of the aforementioned gas flow (i.e. the area of incidence of the axis of symmetry of the gas flow on the surface of the material being processed in the case of a cutting process), a better performance in terms of process speed may be obtained. Such imbalance indeed generates a molten groove area hit by the assist gas flow which is greater than the symmetrical case of coincidence of the axes. In other words, the incidence of the laser beam on the material in advance of the gas flow allows a lower pressure gas delivery at the same speed compared to the symmetrical case of coincidence of the axes, ensuring a lower gas consumption proportional to the lower pressure.

In the case of "dynamic" modification or "apparent beam" regime, the relative position of the optical axis of the laser beam relative to the axis of symmetry of the assist gas flow (distance, angle relative to a local advance direction along the working path, taken as a reference direction) is varied at a relative speed of at least one order of magnitude greater than the advance speed of the working process. The optical axis of the laser beam is controlled in a periodic movement relative to the axis of the flow of the assist gas at a predetermined surrounding movement frequency, in order to make sure the working process on the material sees an apparent beam describable by the envelope of the beam's movement at a frequency scale on an order of magnitude less than the surrounding movement frequency.

As a result of an oscillating, back and forth movement of the optical axis relative to the propagation direction of the axis of the assist gas flow, an apparent beam with a somewhat elongated elliptical shape is for example determined, which allows a greater illumination of the molten groove, i.e. an illumination that lasts longer in the groove, which in turn allows greater absorption of the radiation by the material in the direction of propagation. This technique allows an electric power savings, because it increases the yield per watt of power of the laser beam, and conserves gas, because it keeps the material in a less viscous condition than the prior art, whereby it is possible to push the molten material out of the groove with less gas pressure.

Otherwise, as a consequence of a circular oscillation movement of the optical axis, i.e. the barycenter of distribution of the laser power, around the axis of the assist gas flow a circular apparent beam is determined, for example, which allows the diameter (apparent) of the laser beam power distribution to increase, and thus a greater gas flow within the groove is obtained at the same pressure.

According to the invention, the application of the aforementioned considerations to the systems of the prior art is achieved by implementing an efficient control of the position of the optical axis of the processing laser beam relative to the axis of symmetry of the assist gas flow by means of controlling the shape of the laser beam in real time, i.e. by means of a modification of the transverse power distribution of the beam, which substantially preserves the shape and the effective diameter of the beam.

The present invention is based on the principle of using an optical system with controlled deformation known per se in scientific applications for the processing of optical signals (hence of low-power optical radiation) to shape a high-power laser beam for industrial applications.

The application of a controlled deformation optical system in a laser beam optical transport system allows the range of shaping of the laser beam obtainable in a rapidly modifiable manner to be expanded and to regulate with extreme precision the mutual position between the propagation axis of the laser radiation and the outflow axis of the assist gas, and consequently to improve performance in the machining processes or to implement innovative machining processes.

Advantageously, the method of the invention allows the laser beam to be directed at the center of the assist gas outflow region with high precision, thus preventing the need for precise mechanical adjustments by means of an operator's intervention when setting the machine for a predetermined process.

Still more advantageously, the method of the invention allows the position of the optical axis of the laser beam to be controlled according to a predetermined spatial relationship to the axis of the assist gas flow, which is not necessarily a coaxially aligned position, with a quick adjustment time so that such position control may not only be performed as a "preparatory setup" for a processing cycle but may also be implemented in real time during a working process in such a way as to control the desired mutual position between the optical axis of the laser beam and the axis of the assist gas flow along the working path on the material.

In other words, the method of the invention allows a predetermined mutual positioning strategy to be automatically set and maintained between the optical axis of the laser beam and the axis of the assist gas flow during a working process, e.g. by instantaneously controlling the position of the optical axis of the laser beam at a predetermined distance from the axis of the assist gas flow and at a predetermined angular direction relative to the current direction of the working path (the advance direction of the process).

The method of the invention further allows a mutual positioning variable strategy between the optical axis of the laser beam and the axis of the assist gas flow to be set automatically during a working process, e.g. as a function of the spatial position of the working area on the material along a predetermined working path or as a function of other parameters, such as the variations in advancing speed along the working path, the thickness variations of the working material, the variations of the angle of incidence of the assist gas relative to the surface of the material being processed.

Variations in the advancing speed along the working path arise from the necessary stops of the various mechanical control axes of the working head that contribute to the definition of the path itself, e.g. due to the reversal of the working direction or orientation of the head, which is preceded by a slowdown until stopping and is followed by a subsequent acceleration, both in the case of a cutting and of a welding process.

Changes in the thickness of the working material, known and expected, require not only a corresponding advancing speed and focal spot position within the material itself that are different depending on the thickness, but may also require a different mode for breaking the rotational symmetry, i.e. a "static" or "dynamic" modification of the position of the optical axis of the processing laser beam relative to the axis of symmetry of the assist gas flow as a function of said thickness.

Finally, variations in the angle of incidence of the assist gas relative to the surface of the working material require a different distribution of laser power around the axis of the gas flow to improve the cutting performance, ensuring a more stable process due e.g., to a wider groove or to a better delivery of the assist gas supply.

The control of the mutual position between the propagation axis of the laser radiation and the assist gas outflow axis is implemented according to the invention by means of a control of the transverse power distribution of the beam in an area of the working plane on the metallic material in a predetermined neighborhood of the assist gas flow axis defining a delivering area of said flow. The delivering area of the assist gas flow—which represents the volumetric field of action of the control method of the invention—is identifiable as the "affected volume" of the nozzle of a working head—a nozzle typically having a mouth whose diameter is between 1 mm and 3.5 mm and dimensions which are typical of a truncated cone with a height of 6 mm to 20 mm, a smaller base (at the nozzle) of diameter equal to the mouth diameter increased by 1 to 3 mm, and a larger base whose characteristic dimension is a function of the height of the frustoconical volume and the angle of inclination of the generating line, typically between 15 and 30 degrees. Appropriately, the volume of the nozzle is as small as possible, and it has the slimmest appearance possible so that it may also operate within concavities of the surfaces to be processed.

Advantageously, the automatic control performed by the method of the invention may be carried out in real time with operating frequencies between 100 Hz and 10 kHz.

A control system adapted to carry out the method of the invention is advantageously distinguished from the prior art systems because it may be integrated into a working head, i.e. it is independent from the generation of the laser beam and from its conveyance to the working head.

Moreover, unlike the known solutions for setting or commissioning a machine for a specific process, wherein the position of the optical beam relative to the assist gas flow is adjustable as a result of a manual intervention by an operator, or wherein the modification of the direction of incidence of the optical beam is implemented according to a predetermined logic, as is the case in the prior art of wobbling, by means of which a high dynamic oscillation, programmed when setting a working program, is repeatedly imparted to the optical axis of propagation of the laser beam throughout the entire process, the method of the invention allows the position of the optical axis of propagation of the laser beam to be effectively controlled in real time as a function of the beam's location along a working path, whereby it is possible to change the mutual position between the optical propagation axis of the optical beam and the axis of the assist gas flow on a timely basis depending on the programmed working conditions that occur at predetermined positions along the working path. Such programmed working conditions include, by way of illustrative and non-limiting example, the current working position (or, more generally, the area of the current working plane) along a predetermined working path and/or the current direction of the working path on the material and/or the translation direction of the axis of the assist gas flow.

BRIEF DESCRIPTION OF THE DRAWINGS

Further features and advantages of the invention will be described in greater detail in the following detailed description of one embodiment thereof, given by way of non-limiting example, with reference to the accompanying drawings wherein.

DETAILED DESCRIPTION OF THE PREFERRED EMBODIMENTS

FIGS. 1 through 5 have been previously described with reference to the prior art and their contents are hereby referred to as being common to the manufacture of a processing machine controlled for carrying out a working process according to the teachings of the present invention.

Figure 1:
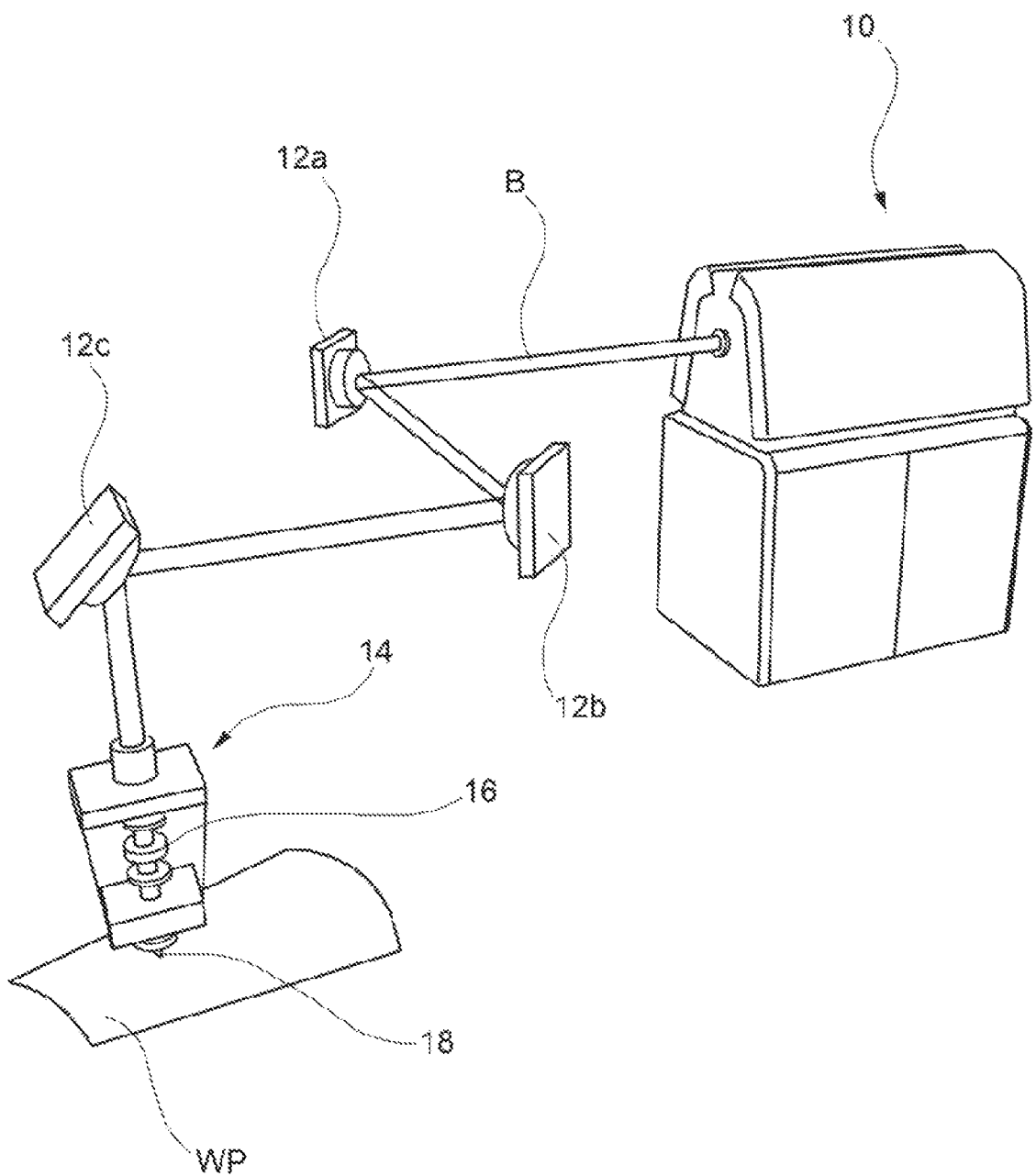
FIGS. 1 and 2 are examples of machines for laser processing according to the prior art.
Figure 2:
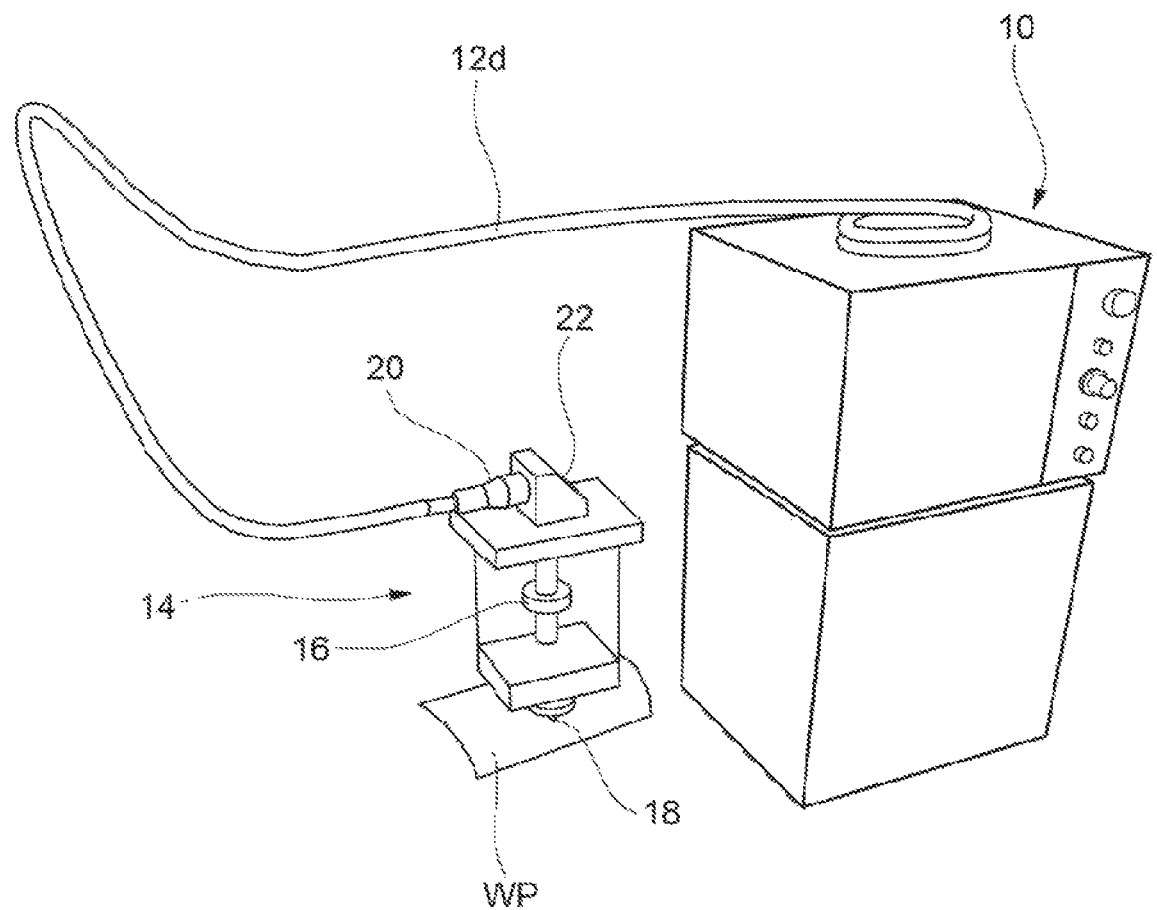
Figure 3:
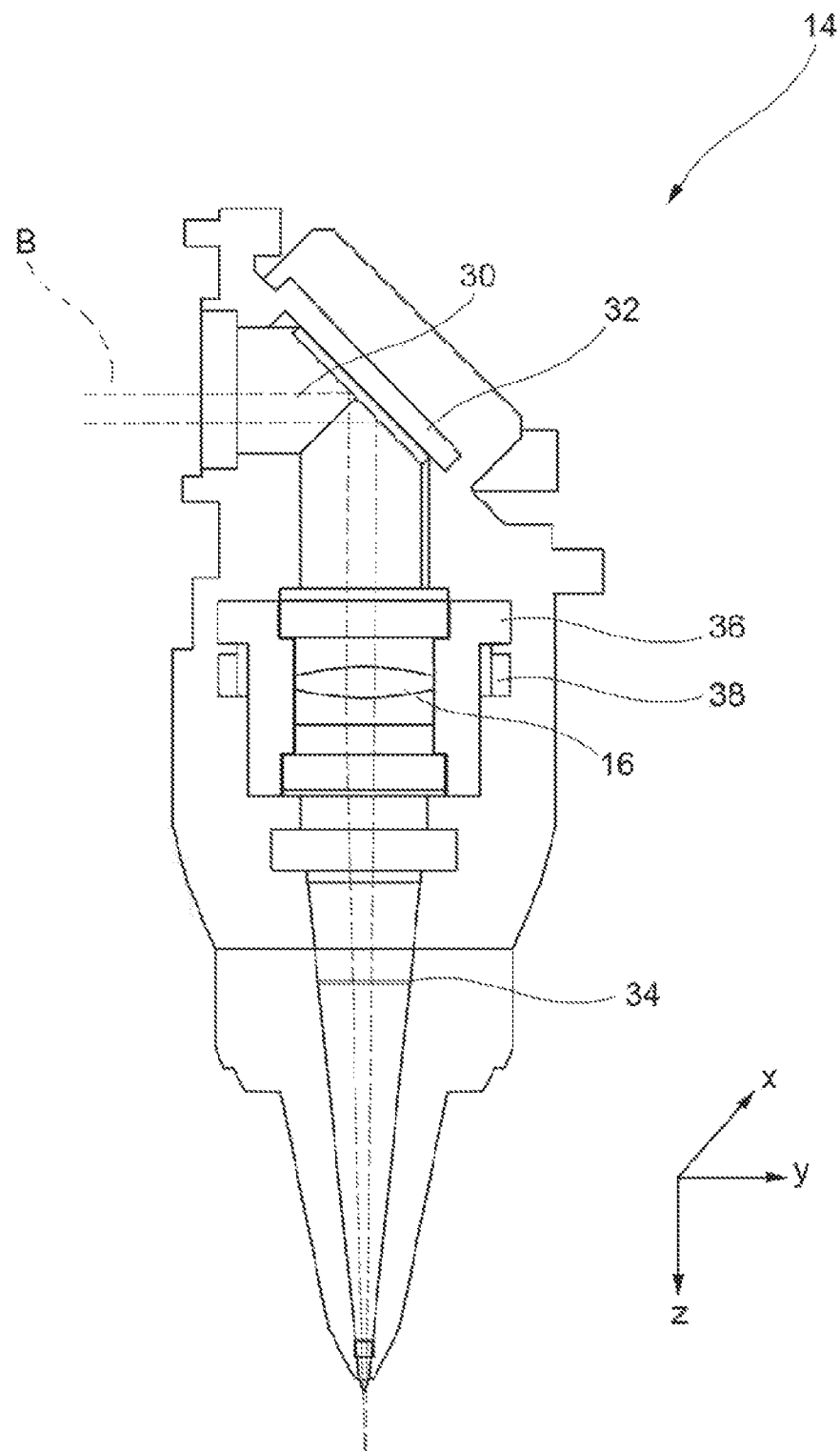
FIG. 3 shows an example of the structure of a working head of a laser machine according to the prior art.
Figure 4:
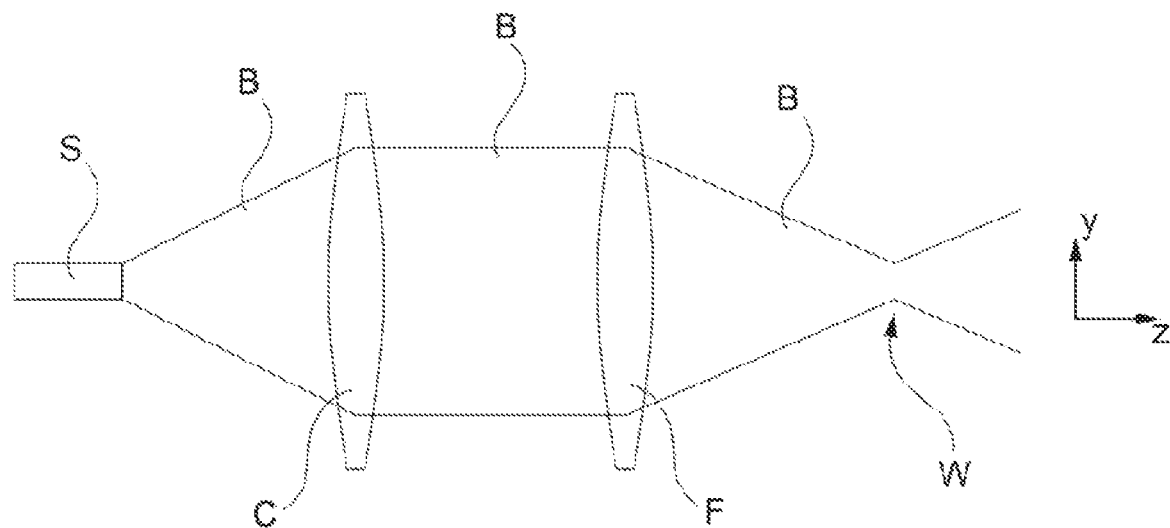
FIGS. 4 and 5 show a schematic representation of the shape of a laser beam for applications of industrial processing of metallic materials according to the prior art.
Figure 5:
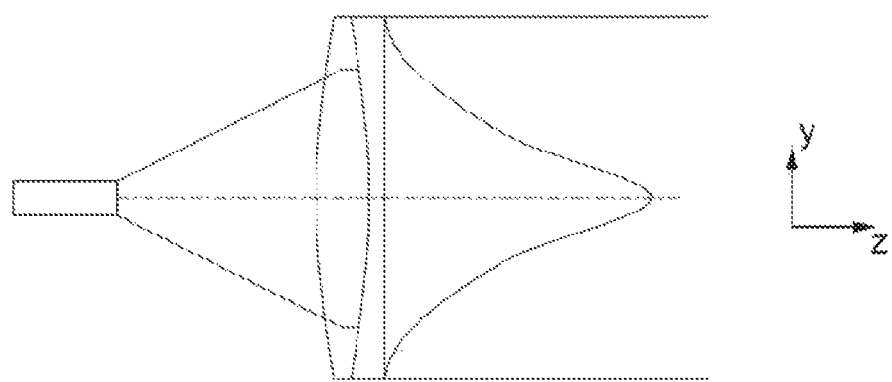
Figure 6:
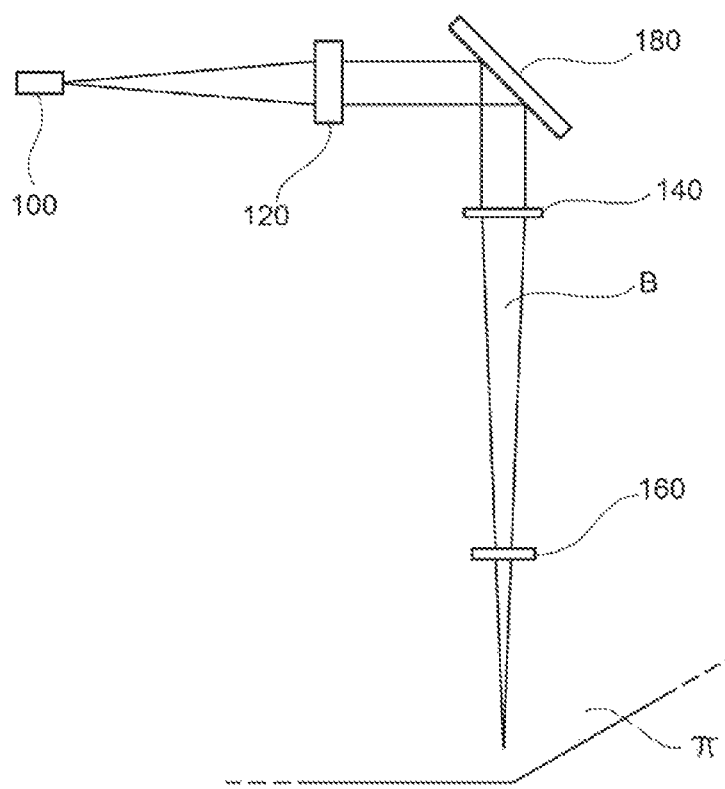
FIG. 6 is a schematic diagram of an optical path of a laser beam in a working head adapted to perform the method of the invention.

An optical path of a laser beam in the working head of a machine for the laser processing of metallic materials according to the invention is diagrammed in FIG. 6.

The optical system of FIG. 6 comprises an input device 100 of a laser beam B, such as e.g. the end of a fiber optic cable or an optical pickup system of a beam propagated by an emitting source along an optical path in free space, from which the laser beam B emerges with a predetermined divergence.

Downstream of the input device 100, an optical collimation system 120 is arranged, for example a collimation lens (typically a collimation lens for a working head of a laser cutting machine has a focal length from 50 mm to 150 mm), downstream of which the collimated laser beam is conducted to an optical focusing system 140, e.g. a focusing lens (typically a focusing lens for a working head of a laser cutting machine has a focal length from 100 mm to 250 mm), arranged to focus the beam on a working plane Π through a screen or protective glass 160.

In the optical path between the collimation optical system 120 and the optical focusing system 140, optical beam shaping means 180 are interposed.

In particular, with reference to the schematization of the optical path of a laser beam shown in FIG. 6, the present invention relates to making optical means 180 for shaping the laser beam and the control of said means for achieving a transverse power distribution of the laser beam in a controlled manner on a predetermined working plane of the material. In the figure, the optical means 180 for shaping the laser beam are shown in an illustrative embodiment wherein they are arranged with their own axis of symmetry at 45° relative to the propagation direction of the beam.

Figure 7:
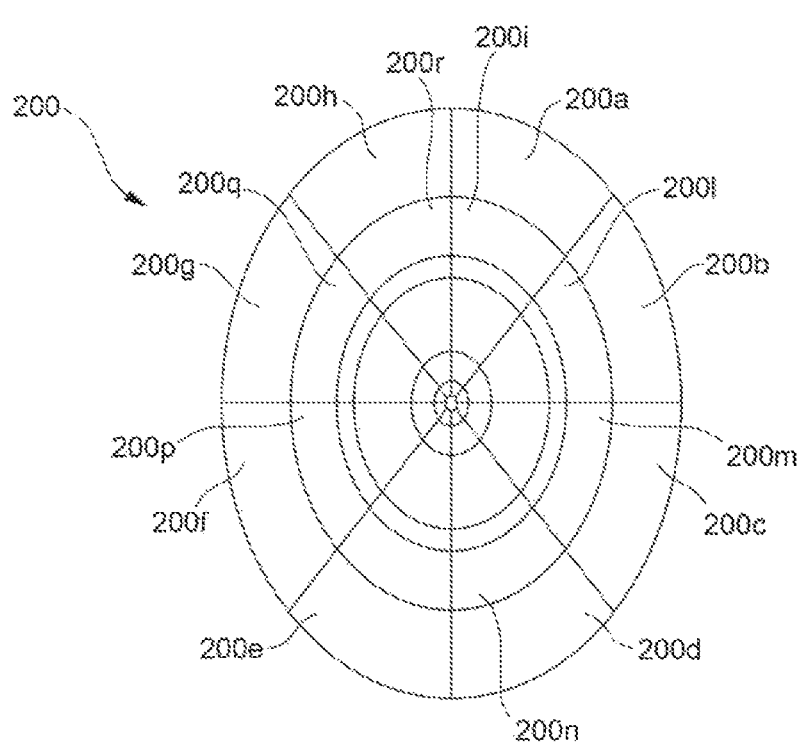
FIG. 7 is a schematic representation of a controlled surface reflecting element for the shaping of the optical beam for the implementation of the method of the invention.

To this end, the optical means 180 for shaping the laser beam are made as a deformable reflecting element 200 with a controlled surface, comprising a plurality of reflection areas independently movable, as diagrammed in FIG. 7, which, in a rest state, define a reflective surface lying on a reference reflection plane. Said deformable, controlled surface reflecting element 200 provides a continuous foil mirror, the reflective surface of which is modifiable three-dimensionally with respect to the reference flat reflective surface adopted in the rest state. Said deformable, controlled surface reflecting element 200 has a reflective surface with continuous curvature including a plurality of reflection areas with which there is associated posteriorly a corresponding plurality of movement modules shown in the figure with 200a, 200b, ... and is appropriately treated for the use with high optical power by virtue of the joint use of a highly reflective coating (at least 99%) at the wavelength of the laser beam, and a mounting on a contact holder, cooled with water by direct channeling. The movement modules are integral to the continuous curvature reflective surface and are independently movable. The reflection areas of the reflective surface with continuous curvature have no edges between them, i.e., the overall reflective surface has continuous local derivatives in all directions. The movement of said plurality of movement modules 200a, 200b includes translation movements of the corresponding reflection areas, such as forward or backward movements, relative to the reference flat reflective surface adopted in the rest state or rotational movements of the corresponding reflection areas around an axis parallel to the reference flat reflective surface adopted in the rest state, or even a combination of the same. The deformations of the reflecting surface, i.e. the movements of the movement modules 200a, 200b, are preferably actuated by known piezoelectric techniques, which make it possible to control the movement of the movement modules and the consequent position of the reflection areas, i.e. their modification of position resulting from a combination of movement by translation and/or rotation of each module at a predetermined number of degrees of freedom independently of the others, typically on travels on the order of +/−40 μm, by means of which it is possible to obtain approximations of continuous curvature surfaces defined by combinations of Zernike polynomials, through which it is possible (at least in theory and with sufficient approximation in practice for the desired purposes) to apply an adjustment of the position of the optical propagation axis of the laser beam or more generally a control of the transverse power distribution of the laser beam, according to the objects of the desired processing applications.

FIG. 7 shows a preferred embodiment of the reflector element 200 with an elliptical profile and the related rear movement modules, adopted for an angle of incidence of the collimated laser beam of 45°, as shown in the diagram of FIG. 6. Such embodiment is to be understood as purely illustrative and non-limiting to the implementation of the invention. In a different preferred embodiment, wherein the incidence of the collimated laser beam is perpendicular or almost perpendicular to the surface of the element 200 in the rest state, the profile of the reflective element 200 is a circular profile.

In the embodiment of the reflective element with an elliptical profile, the same has a major axis of 38 mm and a minor axis of 27 mm, corresponding to the maximum transverse aperture size of the laser beam incident on the mirror obtainable by the collimation optical system 120.

Specifically, in a preferred embodiment, said deformable, controlled surface reflecting element 200 includes a plurality of reflection areas independently movable by means of a corresponding plurality of movement modules which comprise a central area and a plurality of ranks of circular crown sectors concentric to said central area. In the currently preferred embodiment, the ranks of concentric circular crown sectors are 6 in number, the circular crown sectors are 8 in number for each rank, and the height of the circular crown sectors increases from the first to the third rank and from the fourth to the sixth rank in the radial direction to the outside of the reflective element. The height of the circular crown sectors of the fourth rank is intermediate between the height of the circular crown sectors of the first and second rank. Preferably, in order to simplify the control structure of the reflecting element 200 as designed, the plurality of circular sectors forming the peripheral circular crown may be fixed, and only the ranks of the inner circular crown sectors are movable in such a way that they may employ a total number of actuators limited to 41.

In general, the numbers of ranks of circular sectors, the number of circular crown sectors and the height of the circular crown sectors are determined according to the reflecting surface geometries necessary for obtaining predetermined desirable transverse power distributions of the laser beam, through simulation procedures of the trends of the transverse power distributions of a laser beam incident on the reflective element for a selected number of reflection areas. In fact, the controlled deformability of the reflection surface of the element 200 induces controlled variations of the intensity of the laser beam on the focal plane by acting on the phase of the laser beam. In the currently preferred embodiment, the deformation of the surface of the reflective element 200 is controlled in such a way as to determine a reflective surface ascribable to a combination of Zernike polynomials. Thus, the distribution of the intensity of the laser beam on the focal plane according to the phase variations controlled by the movement of the reflection areas of the reflective element 200 may be advantageously simulated using mathematical calculation methods.

The geometry of the subdivision of the surface of the reflecting element 200 illustrated in FIG. 7—corresponding to the geometry of the movement modules of the reflection areas—has been determined by the inventors through a simulation procedure to obtain different forms of transverse power distribution with a great freedom in beam shaping, even not related to the retention of the rotational symmetry thereof. Otherwise, for applications strictly related to the Gaussian power distribution, wherein a change in the shape of the power distribution is not required, but only the displacement thereof with respect to the optical propagation axis, it is possible to use simpler geometries, for example equally spaced ranks, i.e. wherein the height of the circular crown sectors is constant among all the ranks of the sectors. For applications wherein a rotational symmetry of the beam power distribution is to be retained, it is possible to provide for a plurality of reflection areas and respective movement modules in the form of radially independent circular crowns.

Figure 8:
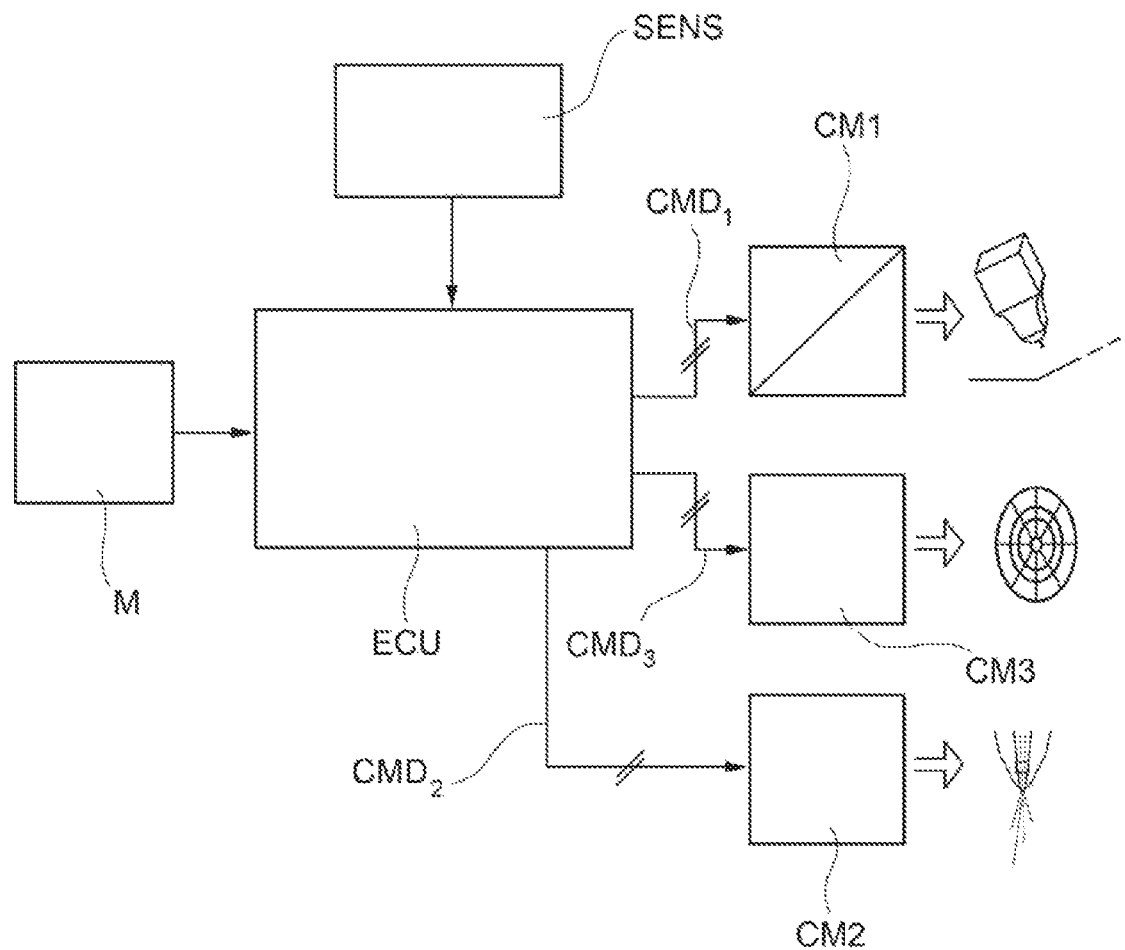
FIG. 8 is a block diagram of control electronics of a laser processing machine, adapted to perform a processing method according to the invention.

FIG. 8 shows a circuit diagram of an electronic control system of a machine for the laser processing of metallic materials for the implementation of the method of the invention.

The system comprises electronic processing and control means shown in the figure collectively at ECU, which may be integrated into a single processing unit on board a machine or implemented in a distributed form, thus comprising processing modules arranged in different parts of the machine, including, for example, the working head.

Memory means M associated with the electronic processing and control means ECU store a predetermined processing pattern or program, for example comprising a predetermined working path in the form of movement instructions for the working head and/or for the material being processed, and physical processing parameters indicating the power distribution of the optical beam, the power intensity of the beam, and laser beam activation times as a function of the working path.

The electronic processing and control means ECU are arranged for accessing the memory means M to acquire a working path and to control the application of the processing laser beam along said path. The control of the application of the laser beam along the predetermined working path includes the control of the delivery of an assist gas flow and the control of the radiation of a predetermined power distribution of the laser beam toward a predetermined working area by reference to the predetermined processing pattern or program, i.e., according to the working path information and working parameters acquired from the memory means.

The sensor means SENS are arranged on board the machine to detect in real time the mutual position between the working head and the material being processed as well as the change over time of such position.

The electronic processing and control means ECU are arranged to receive from the sensor means SENS signals indicative of the mutual position between the working head and the material being processed over time, i.e. the change of the area of the current working plane and/or of the current direction of the working path over time.

The electronic processing and control means ECU comprise a first control module CM1 for controlling the mechanical parameters of the processing, arranged to emit first command signals $CMD_1$ to a known assembly of actuator means, comprising actuator means for moving the working head along the degrees of freedom allowed to it by the specific embodiment of the machine and actuator means for moving the material being processed with respect to the position of the working head, adapted to cooperate with the actuator means for moving the working head to present a programmed working path on the material being processed at the nozzle of the working head. These actuator means are not described in detail because they are known in the art.

The electronic processing and control means ECU comprise a second control module CM2 for controlling the physical parameters of the processing, arranged to emit second command signals $CMD_2$ to assist gas flow delivery means and control means for generating and transmitting the laser beam.

The electronic processing and control means ECU comprise a third control module CM3 for controlling the optical processing parameters, arranged to emit third command signals $CMD_3$ to the deformable, controlled surface reflecting element 200 of the optical beam shaping means for the implementation of the movement modules of the independently movable reflection areas of said element, i.e. to control their mutual spatial displacement (translation along the optical axis of the reflecting element or inclination relative to it). The command signals $CMD_3$ are processed by means of a computer program comprising one or more code modules having instructions of a regulation model or program for the implementation of the method of the invention according to the predetermined shaping of the laser beam to be obtained, i.e. to establish a predetermined transverse power distribution of the laser beam, and consequently a predetermined position of the optical propagation axis of the laser beam, as a function of the instantaneous processing conditions along an optical propagation axis incident on the material in an area of at least one working plane of the metallic material, the working plane of the material being the surface plane of the material or a plane which varies in depth in the thickness of the material, e.g. for cutting or drilling of thick materials, i.e. typically with thicknesses greater than 1.5 times the Rayleigh length of the focused beam (in the typical case, thicknesses greater than 4 mm and up to 30 mm). The aforementioned command signals $CMD_3$ are also processed by the computer program to establish the predetermined transverse power distribution of the laser beam in a predetermined neighborhood of the axis of the assist gas flow and within a delivering area of said flow according to the instantaneous working conditions, i.e., the area of the current working plane and/or the current direction of the working path on the metallic material.

The electronic processing and control means ECU are therefore arranged to detect the current position and/or the current translation direction of the axis of the assist gas flow to control the relative translation of the axis of the assist gas flow along a predetermined working path on the metallic material and to automatically adjust the position of the optical propagation axis of the laser beam or the transverse power distribution of the laser beam according to the current position and/or the detected current direction of translation of the axis of the assist gas flow.

The position of the optical propagation axis of the laser beam is governed by controlling the movement modules of the reflection areas so as to carry out predetermined general inclination movements of the reflecting element as a whole relative to the respective rest state which determine the spatial translation of the spot of the laser beam on the material being processed.

According to one embodiment, the position of the optical propagation axis of the laser beam is adjusted so as to be selectively or alternately in a front area and in a rear area with respect to the current position of the axis of the assist gas flow along the working path during a cutting operation of the metallic material. This is preferably done in the pursuit of a cutting path, for example as a function of the speed of execution of the cutting operation and the thickness of the material to be cut.

In the case of a "static" modification, as a result of an imbalance of the position of the optical axis of the laser beam ahead of the axis of symmetry of the assist gas flow in the direction of translation of the aforementioned gas flow (i.e., of the area of incidence of the axis of symmetry of the gas flow on the surface of the material being processed in the case of a cutting process) a better performance in terms of process speed may be obtained. Such imbalance generates a molten groove area hit by the assist gas flow, which is greater than the symmetrical case of coincidence of the axes. In other words, the incidence of the laser beam on the material ahead the gas flow allows a lower pressure gas delivery at the same speed compared with the symmetrical case of coincidence of the axes, ensuring a lower gas consumption proportional to the lower pressure.

In the case of "dynamic" modification or "apparent beam" regime, as a result of an oscillation movement of the optical axis back and forth relative to the direction of propagation of the axis of the assist gas flow, for example an apparent beam with an elongated quasi-elliptical shape is determined, which allows for better illumination of the molten groove, i.e., an illumination that lasts longer on the groove, which in turn allows greater absorption of radiation by the material in the direction of propagation. This technique allows an electrical power savings, because it increases the yield per watt of power of the laser beam, as well as a gas savings, because it keeps the material in a less viscous condition compared with the prior art, whereby it is possible to push the molten material out of the groove with less gas pressure.

In another embodiment, the position of the optical axis of propagation of the laser beam is adjusted so as to follow a circular path around the current position of the axis of the assist gas flow during a drilling operation of the metallic material. This allows an "apparent beam" with wide diameter circular symmetry to be generated, even if starting with a Gaussian beam of a smaller diameter, with two advantages. The first advantage is that the drilling diameter is increased at the end of the process, and thus allows, in the delicate phase at the beginning of the cutting movement, a better coupling between the laser beam and the advancing front within the thickness of the material being processed, as well as a greater gas flow, which allows a more efficient expulsion of the molten material at the start. The second advantage is that during the drilling process, the circular movement imparts a preferential direction of emission on the molten material, which must necessarily exit from the surface of the material processing area from the side wherein the drilling occurs, facilitating the progressive denudation efficiency of ever deeper layers of material, and, ultimately, a faster breakdown of the overall thickness.

Figure 9:
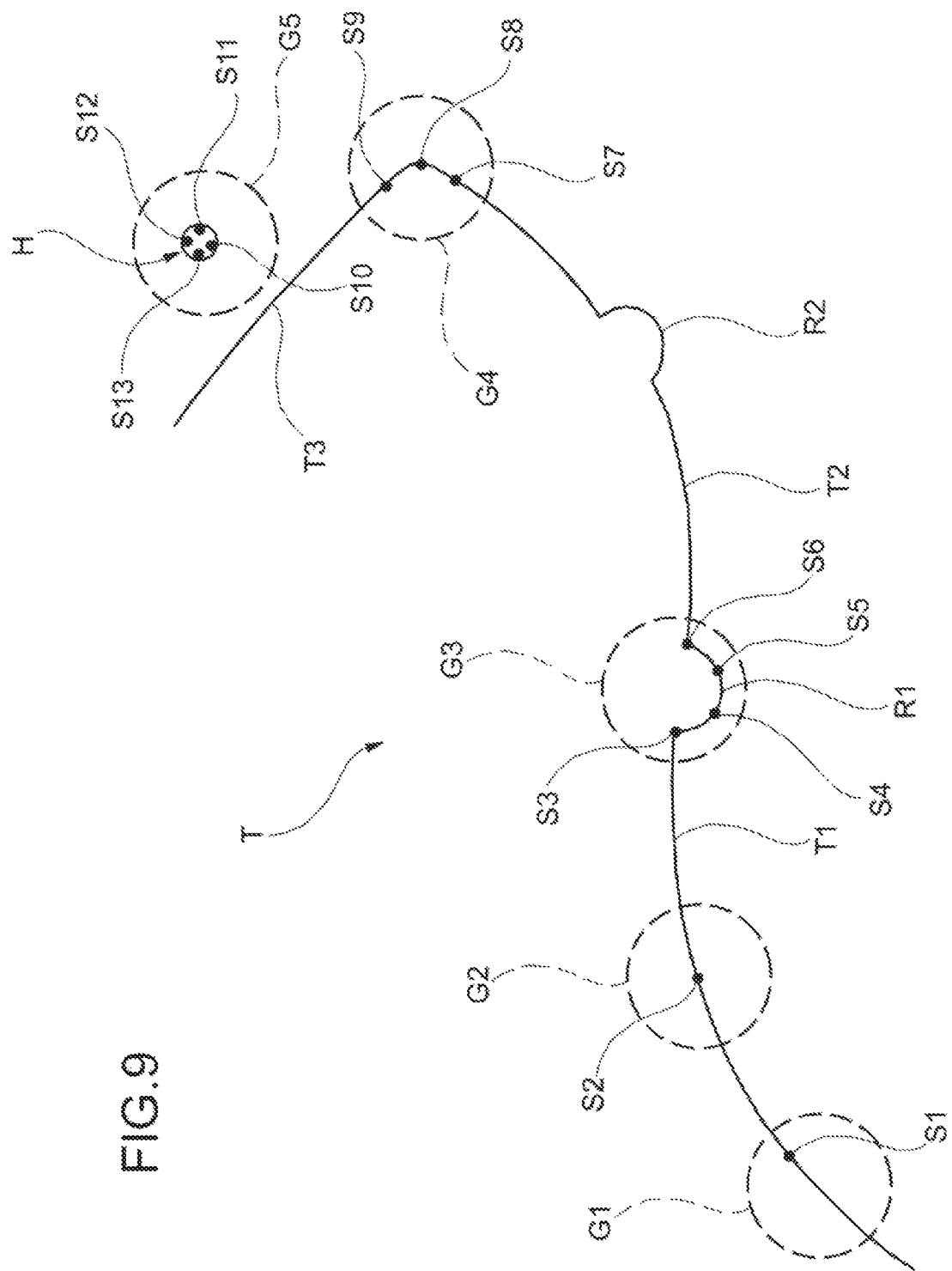
FIG. 9 is a schematic representation of a working example according to the method of the present invention.

FIG. 9 shows an example of processing according to the method of the present invention.

In the figure, a programmed working path is indicated at T. The working path includes a cutting profile comprising, by way of example, a series of curved sections T1, T2 or straight sections T3, forming a closed or open broken line, and a series of recesses, e.g. recesses with a semi-circular profile R1, R2. The working path T also includes a circular drilling profile, indicated at H, at a predetermined distance from the cutting profile.

At some illustrative positions of the working head along the aforementioned path (the working head is diagrammed only in association with an initial working position, in order to not overly complicate the graphic representation), the delivering areas of the assist gas flow on the material being processed are indicated at G1, . . . , Gn, and the spots of incidence of the laser beam on the material being processed circumscribed around the positions of the optical axis of the laser beam are indicated at S1, . . . , Sn. It should be noted that, typically, for cutting and/or drilling operations on carbon steel with thicknesses from 4 mm to 30 mm, stainless steel with thicknesses from 4 mm to 25 mm, aluminum alloys with thicknesses from 4 mm to 15 mm, copper and brass with thicknesses from 4 mm to 12 mm, the typical size of the delivering area of the assist gas flow ranges from 1.8 mm to 3 mm, and the spot of incidence of the laser beam ranges from 0.05 mm to 0.25 mm.

For some working positions or areas along the working path, there are represented, by way of example, the corresponding delivering area of the assist gas flow on the material being processed (circular, in the most common embodiment of a circular nozzle) and one or more spots of incidence of the laser beam (which are also represented by way of illustration by a circular shape, in the common case of transverse power distribution of a Gaussian shape).

G1 indicates a first delivering zone of the assist gas flow in a laser beam advancing section along a first segment T1 of a cutting line following a predetermined path T. In this working area, the position of the optical axis of propagation (of the power distribution) of the laser beam is adjusted so that the spot S1 of incidence of the beam on the working plane lies in a zone ahead of the current position of the axis of the assist gas flow, which corresponds to the barycenter of the G1 zone.

G2 indicates a second delivering zone of the assist gas flow in an advancing section of the laser beam in deceleration along the segment T1 of the cutting line of the path T. In this working area, the position of the optical propagation axis (of the power distribution) of the laser beam is adjusted so that the spot S2 of incidence of the beam on the working plane is substantially coincident with the current position of the axis of the assist gas flow, corresponding to the barycenter of the G2 zone.

G3 indicates a third delivering area of the assist gas flow at the semi-circular recess R1 of the path T. In this working area, the position of the optical propagation axis (of the power distribution) of the laser beam is adjusted in a way such that the spot of incidence of the beam on the working plane travels the desired cutting path within the delivering area of the assist gas flow without the movement of the aforementioned zone, as indicated by the subsequent positions S3, S4, S5 and S6, radially equidistant from the current position of the axis of the assist gas flow, which corresponds to the barycenter of the G3 zone, but angularly offset from a rearward position to a forward position relative to the current direction of the working path on the metallic material.

G4 indicates a fourth delivering area of the assist gas flow at a variation of direction between the section T2 and the section T3 of the cutting profile, wherein the variation of direction has a small radius of curvature. In this working area, the position of the optical axis of propagation (of the power distribution) of the laser beam is adjusted so that the spot of incidence of the beam on the working plane travels the desired cutting path within the delivering area of the assist gas flow, without movement of the aforementioned zone, as indicated by the subsequent positions S7, S8, and S9, having a radial distance and an angular position different from the current position of the axis of the assist gas flow, which corresponds to the barycenter of the G4 zone, i.e. respectively rearward, coincident and forward positions relative to the current direction of the working path on the metallic material.

Finally, G5 indicates a fifth delivering area of the assist gas flow at the circular drilling profile H which can be reached at a predetermined distance from the path T of the cutting profile, by interrupting the laser beam emission for a predetermined time. In this working area, the position of the optical propagation axis (of the power distribution) of the laser beam is adjusted so that the spot of incidence of the beam on the working plane travels a circular path within the delivering area of the assist gas flow, possibly coaxial to the axis of the assist gas flow, which corresponds to the barycenter of the G5 zone, without movement of the aforementioned zone, which is indicated by the subsequent positions S10, S11, S12 and S13.

Naturally, without altering the principle of the invention, the embodiments and the details of implementation may vary widely with respect to that which is described and illustrated purely by way of non-limiting example, without thereby departing from the scope of protection of the invention defined by the appended claims.

What is claimed is:

1. A method of laser processing of a metallic material, for laser cutting, drilling or welding of said material, by means of a focused laser beam having a predetermined transverse power distribution on at least one working plane of the metallic material, the method comprising:
 providing a laser beam emitting source;
 leading a laser beam emitted by said emitting source along a beam optical path to a working head arranged in proximity to said metallic material;
 collimating the laser beam along an optical axis of propagation incident on the metallic material;
 focusing said collimated laser beam in an area of at least one working plane of said metallic material; and
 conducting said focused laser beam along a working path on the metallic material comprising a succession of working areas,
 wherein the method comprises shaping the laser beam, wherein shaping the laser beam comprises:
 reflecting said collimated beam by means of a deformable controlled surface reflecting element having a reflecting surface with a continuous curvature including a plurality of independently movable reflection areas, and controlling the arrangement of said reflection areas to establish a predetermined transverse power distribution of the laser beam on the at least one working plane of the metallic material as a function of the area of the at least one working plane and/or a current direction of the working path on the metallic material;

wherein the method further comprises:

delivering a flow of assist gas towards said area of the at least one working plane of the metallic material along an axis of the assist gas flow;

translating the axis of the assist gas flow along the working path on the metallic material;

detecting at least one of a current position and a direction of the current translation of the axis of the assist gas flow;

controlling the arrangement of said reflection areas to establish said predetermined transverse power distribution of the laser beam in said area of the at least one working plane on the metallic material comprised in a predetermined neighborhood around the axis of the assist gas flow and within a delivering area of said assist gas flow; and automatically adjusting the position of the optical axis of propagation of the laser beam based on at least one of the detected current position and the detected direction of the current translation of the axis of the assist gas flow, wherein the position of the optical axis of propagation of the laser beam is automatically adjusted by changing a mutual position between the optical axis of propagation of the laser beam and the axis of the assist gas flow based on programmed working conditions occurring at predetermined positions along the working path.

2. The method according to claim 1, wherein controlling the arrangement of said reflection areas of the controlled surface reflecting element comprises controlling a combination of moves of said reflection areas with respect to a reflecting reference flat surface.

3. The method according to claim 2, wherein controlling the combination of moves of said reflection areas of the controlled surface reflecting element comprises controlling a translation movement of said reflection areas along the optical axis of the reflecting element and/or a rotation of said areas to obtain an inclination with respect to the optical axis of the reflecting element.

4. The method according to claim 1, further comprising a relative translation of the axis of the assist gas flow along the predetermined working path on the metallic material; wherein the detection of the current position and/or the detection of the current direction of translation of the axis of the assist gas flow, and the automatic control of the transverse power distribution of the laser beam, is based on at least one of the detected current position and the detected direction of the current translation of the axis of the assist gas flow.

5. The method according to claim 4, wherein the automatic control of the transverse power distribution of the laser beam is performed by reference to a predetermined adjustment pattern or program.

6. The method according to claim 1, wherein the automatic adjustment of the position of the optical axis of propagation of the laser beam is performed by reference to a predetermined adjustment pattern or program.

7. The method according to claim 1, wherein the position of the optical axis of propagation of the laser beam is adjusted so as to be alternately in a front area and in a rear area with respect to the current position of the axis of the assist gas flow along the working path during a cutting operation of the metallic material.

8. The method according to claim 1, wherein the position of the optical axis of propagation of the laser beam is adjusted so as to follow a circular path around the current position of the axis of the assist gas flow during a drilling operation of the metallic material.

9. The method according to claim 1, comprising providing the deformable controlled surface reflecting element having the reflecting surface with the continuous curvature including the plurality of independently movable reflection areas by means of a corresponding plurality of movement modules which include a central area and a plurality of ranks of circular crown sectors concentric to said central area.

10. The method according to claim 9, wherein said ranks of concentric circular crown sectors are in number of 6, the circular crown sectors are in number of 8 for each rank, and a height of the circular crown sectors is increasing from a first to a third rank and from a fourth to a sixth rank in a radial direction towards an outside of the reflecting element, the height of the circular crown sectors of the fourth rank being intermediate between the height of the circular crown sectors of the first and second rank.

11. A computer program comprising one or more code modules stored in electronic memory and configured to perform a method of shaping a laser beam in a machine for laser processing of a metallic material, in accordance with the method of laser processing according to claim 1, when the program is executed by electronic processing and control means.

12. A machine for laser processing of a metallic material by performing at least one of laser cutting, drilling or welding of said metallic material, by a focused laser beam having a predetermined transverse power distribution on at least one working plane of the metallic material, comprising:

a laser beam emitting source;

means for leading a laser beam emitted by said emitting source along a beam transport optical path to a working head arranged in proximity of said metallic material;

optical means for collimating the laser beam along an optical axis of propagation incident on the metallic material;

optical means for focusing said collimated laser beam in an area of at least one working plane of said metallic material, wherein at least said focusing optical means of said collimated laser beam are carried by said working head at a controlled distance from said metallic material, wherein said controlled distance is adjusted such that said focused laser beam is conducted along a working path on the metallic material comprising a succession of working areas; and optical means for shaping the laser beam including a deformable controlled surface reflecting element having a reflecting surface with a continuous curvature including a plurality of independently movable reflection areas, adapted to reflect said collimated laser beam, the arrangement of said reflection areas being adapted to establish a predetermined transverse power distribution of the laser beam on the at least one working plane of the metallic material; and electronic processing and control means configured to control the arrangement of said reflection areas to establish the predetermined transverse power distribution of the laser beam on the at least one working plane of the metallic material as a function of the area of the at least one working plane and/or a current direction of the working path on the metallic material, wherein the machine comprises a nozzle for delivering a flow of assist gas towards said area of the at least one working plane of the metallic material along an axis of the assist gas flow;

wherein said electronic processing and control means are further configured to:

translate the axis of the assist gas flow along the working path on the metallic material;

detect at least one of a current position and a direction of a current translation of the axis of the assist gas flow;

control the arrangement of said reflection areas to establish said predetermined transverse power distribution of the laser beam in said area of the at least one working plane on the metallic material comprised in a predetermined neighborhood around the axis of the assist gas flow and within a delivering area of said assist gas flow; and automatically adjust the position of the optical axis of propagation of the laser beam based on at least one of the detected current position and the detected direction of the current translation of the axis of the assist gas flow, wherein the position of the optical axis of propagation of the laser beam is automatically adjusted by changing a mutual position between the optical axis of propagation of the laser beam and the axis of the assist gas flow based on programmed working conditions occurring at predetermined positions along the working path.

\* \* \* \* \*